United States Patent [19]

Steward

[11] Patent Number: 4,652,870

[45] Date of Patent: Mar. 24, 1987

[54] DISPLAY ARRANGEMENTS FOR HEAD-UP DISPLAY SYSTEMS

[75] Inventor: David G. Steward, Kent, England

[73] Assignee: GEC Avionics Limited, England

[21] Appl. No.: 696,304

[22] Filed: Jan. 30, 1985

[30] Foreign Application Priority Data

Feb. 10, 1984 [GB] United Kingdom ............... 8403549

[51] Int. Cl.⁴ ............................................. G02B 27/10
[52] U.S. Cl. ................................. 340/705; 340/980; 350/174; 434/44
[58] Field of Search ............... 340/705, 706, 723, 782, 340/980; 350/174; 358/103, 104, 108, 231, 238, 250; 434/44

[56] References Cited

U.S. PATENT DOCUMENTS

| | | | |
|---|---|---|---|
| 3,547,522 | 12/1970 | Schaeffer | 358/93 |
| 4,099,841 | 7/1978 | Ellis | 350/174 |
| 4,225,215 | 9/1980 | Cojan | 350/174 |
| 4,439,010 | 3/1984 | Doty | 350/174 |
| 4,447,128 | 5/1984 | Ferrer | 350/174 |
| 4,582,389 | 4/1986 | Wood | 350/174 |

FOREIGN PATENT DOCUMENTS

| | | | |
|---|---|---|---|
| 2552397 | 3/1985 | France | 340/705 |
| 2154757 | 9/1985 | United Kingdom | 340/705 |

Primary Examiner—John W. Caldwell, Sr.
Assistant Examiner—Ruffin B. Cordell
Attorney, Agent, or Firm—Kirschstein, Kirschstein, Ottinger & Israel

[57] ABSTRACT

A display arrangement for a head-up display system e.g. for an aircraft, wherein the combiner (13) comprises a first tuned reflective optical film (39) through which an observer (14) views a distant scene and second and third tuned reflective optical films (41 and 43) positioned outside the observer's view of the distant scene through the first film. Light from a projector (11) passes first through the nearer (43) of the second and third films, is then reflected at the other (41) of the second and third films, is then reflected at the nearer film (43) and then passes through the other film (41) to the first film (39) where it is reflected towards the observer. The three films are normally designed to provide the combiner with a desired optical power, the one (43) of the second and third films nearer the projector suitably being concave toward the other (41) of the second and third films for this purpose.

8 Claims, 3 Drawing Figures

DISPLAY ARRANGEMENTS FOR HEAD-UP DISPLAY SYSTEMS

BACKGROUND OF THE INVENTION

1. Field of the Invention

This invention relates to display arrangements for head-up display systems, more especially head-up display systems for use in vehicles, more especially aircraft.

2. Description of Related Art

In recent years there have been proposed various forms of such display arrangement using one or more tuned reflective optical films for the combiner of the arrangement, that is to say, for the element of the arrangement through which the observer views the distant scene and which serves to reflect light representing an image to be displayed to the observer, thereby to superimpose the observer's view of the image on his view of the distant scene.

By "a tuned reflective optical film" is meant an optical film or similar optical element having the property of reflecting efficiently light at particular combinations of wavelength and incidence angle. The film is described as tuned to these combinations of wavelength and incidence angle. Light which does not satisfy the tuned condition is transmitted by the film with little reflection loss.

In one such arrangement, described in United Kingdom Patent Specification No. 2042206 the combiner has first and second tuned reflective optical films each of which intercepts the line of sight of the observer through the combiner and which coverage towards one another so as to define a tapering space; the angular relationship of the films with one another and with the display surface of a projector unit producing the image to be displayed being such that light within a certain narrow waveband from the display surface is, in turn, reflected at the second coating, reflected at the first coating and transmitted through the second coating to the observer's viewing position.

Such an arrangement has the advantage of being compact while providing a large field of view for the observer but has a disadvantage in that the user views the distant scene through two tuned reflective optical films. Inevitably there is a loss of 'real world' brightness with such an arrangement.

SUMMARY OF THE INVENTION

1. Objects of the Invention

It is an object of the present invention to provide a display arrangement for a head-up display system which, whilst retaining the advantages of the above-mentioned arrangement, overcomes the above-mentioned disadvantage.

2. Features of the Invention

According to the present invention a display arrangement for a head-up display system comprises: an optical projector arrangement comprising a display device for presenting luminous data to be displayed and a lens system for developing at an image plane a real image of the luminous data so presented; and a combiner assembly comprising: a first tuned reflective optical film supported at a position such as to intercept he forward line of sight from an eye position prescribed for a user of the arrangement; and second and third tuned reflective optical films supported between said image plane and said first film, with the third film nearer said image plane, at a position such as not substantially to obstruct the user's view through said first film from said eye position; the positional relationship between said first, second and third films, and said image plane being such that light from said projector arrangement within a prescribed waveband is first incident on said third film at an angle at which said third film is not tuned for reflection and accordingly is transmitted by said third film; such that the light thus transmitted by said third film is incident on said second film at an angle at which said second film is tuned for reflection; such that the light thus reflected at said second film is incident on said third film at an angle at which said third film is tuned for reflection; such that the light thus reflected at said third film is incident on said second film at an angle at which said second film is transmissive, and such that the light thus transmitted by said second film is incident on said first film at an angle at which said first film is tuned for reflection, thereby to reflect the light to said eye position.

Preferably the combiner assembly possesses optical power. In such an arrangement the focal plane of the combiner assembly is preferably substantially coincident with said image plane.

The optical power of the combiner is preferably obtained at least partly by virtue of said third film being concave towards said second film. By a combiner assembly possessing optical power is meant a combiner assembly which serves to focus light rays incident thereon at a finite distance from the assembly.

In one particular arrangement in accordance with the invention said second and third films define between them a tapering space which narrows in a direction towards said eye position.

BRIEF DESCRIPTION OF THE DRAWINGS

One display arrangement in accordance with the invention will now be described by way of example with reference to the accompanying drawings in which.

DETAILED DESCRIPTION OF THE PREFERRED EMBODIMENTS

Figure 1:
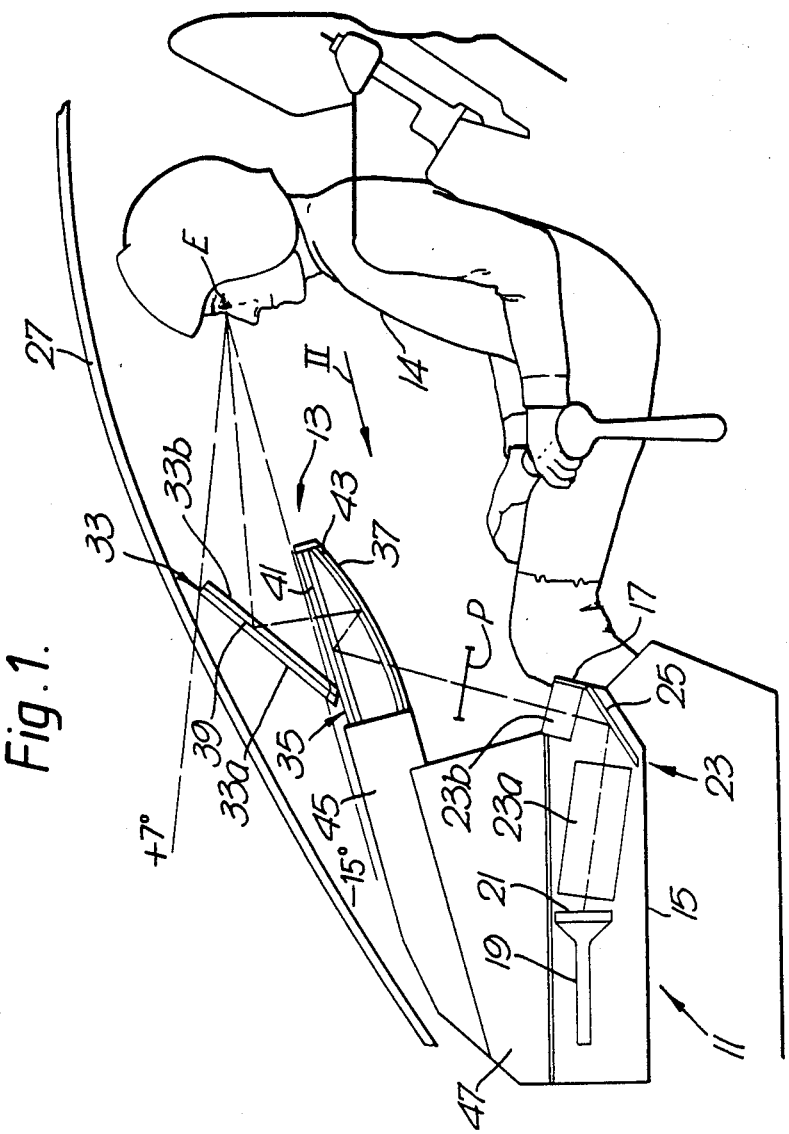
FIG. 1 is a diagram showing the arrangement installed in an aircraft cockpit.

Referring to FIG. 1, the arrangement comprises an optical projector 11 and a combiner assembly 13.

The projector has a housing 15 which is supported at a position approximately level with the thighs of a pilot 14 seated in the cockpit with the rear end 17 of the housing occupying a position between the pilot's knees.

Within the housing 15 there are, inter alia, a cathode ray tube 19 having a screen 21 coated with a green light emitting phosphor, and a relay lens 23 in two parts, 23a, 23b.

The lens parts 23a and 23b are spaced apart and folded so that both parts 23a, 23b lie in the light path from the cathode ray tube 19 with the part 23b directed upwardly and rearwardly towards the combiner assembly 13. Between the two parts 23a, 23b there is a folding mirror 25 serving to deflect light from the part 23a to the part 23b. The projector 11 is arranged to produce a real image of the display on the screen 21 at a plane P.

The aircraft has a cockpit canopy 27.

The combiner assembly comprises an optically flat first member 33 of glass or other light transparent material which is supported inclined in the fore and aft direction of the aircraft at a position to intercept the forward line of sight of the pilot from a prescribed eye position E to the forward distant scene through the cockpit canopy 27.

The combiner assembly further includes an optically flat second member 35 of glass or other light transparent material positioned below the member 33, between the member 33 and the relay lens part 23b, and a third member 37 of glass or other light transparent material positioned below the member 35, between the member 35 and the relay lens part 23b. The member 37 is spherically concavely curved towards the member 35 and defines with the member 35 a tapering space which narrows in a direction towards the eye position E.

Each of the members 33, 35 and 37 is in the form of two sheets, as, for example, sheets 33a and 33b of member 33, and at the interface between the sheets of each member 33, 35 or 37 there is a respective tuned reflective optical film 39, 41 or 43 formed as a coating on one of the component sheets of that member.

The films 39, 41, 43 may be given their optically tuned characteristics by any suitable method. Conveniently the tuned characteristics may be imparted to the several films using the method described in the specification of United kingdom Patent No. 2071866.

The members 33, 35 and 37 are carried by a frame 45 which is in turn supported on a structure 47 above the projector 11. The structure 47 further supports two cathode ray tubes, 49a and 49b which provide the pilot with head-down displays below the head-up display, and between the head-down displays there is an instrument panel 51.

The members 35 and 37 are supported at a position such as not to obstruct the pilot's view through the member 33, that is to say, so not to project into the notional volume defined by line radiating from the eye position E to the member 33.

The members 35 and 37 are further positioned with respect to the projector 11 so that the focal plane of the combiner assembly is coincident with the image plane P.

The members 35 and 37 are further positioned with respect to one another and the member 33 so that (i) light rays within a prescribed waveband from the projector arrangement are incident on the third film 43, that is to say the film closest to the plane P, at an angle at which the third film 43 is not tuned for reflection and are accordingly transmitted to the second film 41

(ii) the angular relationship of the second and third films 41, 43 is such that the rays transmitted as aforesaid by the third film 43 are incident on the second film 41 at an angle at which the second film 41 is tuned for reflection, (iii) rays thus reflected at the second film 41 are incident on the third film 43 but, by virtue of the angular relationship of the second and third films, at an angle at which the third film 43 is tuned for reflection, (iv) rays thus reflected at the third film 43 are incident on the second film 41, but by virtue of the said angular relationship between the second the third films are incident at an angle at which the second film 41 is transmissive and, (v) the rays thus transmitted through the second film 41 are incident on the first film 39 at an angle at which the said first film 39 is tuned for reflection and, by virtue of the angular inclination of the first film, are reflected to the said eye position E.

The pilot thus sees an image of the display on the screen 21 of the cathode ray tube 19 superimposed on his view of the distant scene through the member 33 and canopy 27.

It will be appreciated that in the arrangement described by way of example, since the image plane P of the projector 11 and the focal plane of the combiner assembly are coincident, the combiner assembly 13, in particular the film 43, performs a collimating function.

Accordingly the pilot sees a virtual image of the display which appears to be at infinity, as required in order for the display to be superimposed on the pilot's view of the distant scene. However, if it is required to produce a virtual image at a finite distance, i.e. at a relatively near position, e.g. as required in aircraft simulator applications, the display arrangement may be designed with an appropriate displacement between the projector image plane P and the combiner assembly focal plane to achieve this.

In the embodiment described by way of example the optical power of the combiner assembly 13 results solely from the film 43 only, films 39 and 41 possessing the reflective powers of plane reflectors only. It should, however, be understood that in other arrangements in accordance with the invention a different film or two or more of the films may produce the optical power of the combiner assembly.

Figure 2:
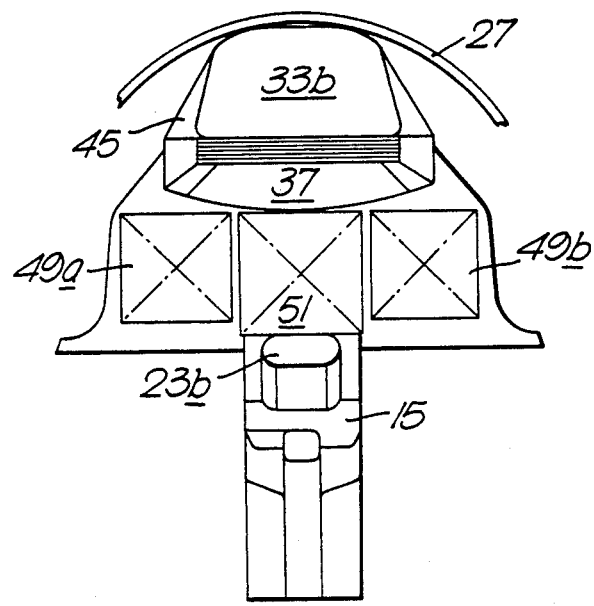
FIG. 2 is a view in the direction of the arrow II in FIG. 1.
Figure 3:
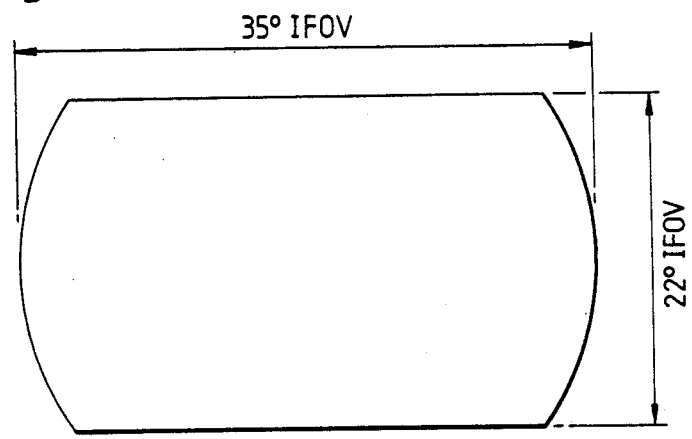
FIG. 3 is a representation of the instantaneous field of view provided by the display arrangement from the design eye position of the arrangement.

The large instantaneous field of view (IFOV) available to the pilot using the display depicted in FIGS. 1 and 2 is represented in FIG. 3. From FIG. 1 it will be observed that the 22° vertical field of view extends from 7° above to 15° below the horizontal, that is to say down to the overnose angle from the eye position E.

I claim:

1. A display arrangement for a head-up display system comprising: an optical projector arrangement comprising a display device for presenting luminous data to be displayed and a lens system for developing at an image plane a real image of the luminous data so presented; and a combiner assembly comprising: a first tuned reflective optical film supported at a position such as to intercept the forward line of sight from an eye position prescribed for a user of the arrangement; and second and third tuned reflective optical films supported between said image plane and said first film, with the third film nearer said image plane, at a position such as not substantially to obstruct the user's view through said first film from said eye position; the positional relationship between said first, second and third films, and said image plane being such that light from said projector arrangement within a prescribed waveband is first incident on said third film at an angle at which said third film is not tuned for reflection and accordingly is transmitted by said third film; such that the light thus transmitted by said third film is incident on said second film at an angle at which said second film is tuned for reflection; such that the light thus reflected at said second film is incident on said third film at an angle at which said third film is tuned for reflection; such that the light thus reflected at said third film is incident on said second film at an angle at which said second film is transmissive, and such that the light thus transmitted by said second film is incident on said first film at an angle at which said first film is tuned for reflection, thereby to reflect the light to said eye position.

2. An arrangement according to claim 1 wherein the combiner assembly possesses optical power.

3. An arrangement according to claim 2 wherein the focal plane of the combiner assembly is substantially coincident with said image plane.

4. An arrangement according to claim 2 wherein the optical power of said combiner assembly is obtained at least partly by virtue of said third film being concave towards said second film.

5. An arrangement according to claim 1 wherein said second and third films define between them a tapering space which narrows in a direction towards said eye position.

6. An arrangement according to claim 1 wherein each said film is in the form of a coating on a sheet of light transparent material.

7. An arrangement according to claim 6 wherein said coating is at the interface between said sheet and a further sheet of light transparent material.

8. An arrangement according to claim 1 wherein said combiner assembly is positioned above said projector arrangement.

* * * * *